(12) United States Patent
McRae

(10) Patent No.: US 12,464,095 B2
(45) Date of Patent: Nov. 4, 2025

(54) SMART SECURITY CAMERA SYSTEM WITH AUTOMATICALLY ADJUSTABLE ACTIVITY ZONE AND METHOD

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 17/724,953

(22) Filed: Apr. 20, 2022

(65) Prior Publication Data

US 2022/0345623 A1 Oct. 27, 2022

Related U.S. Application Data

(60) Provisional application No. 63/178,852, filed on Apr. 23, 2021.

(51) Int. Cl.
*H04N 7/18* (2006.01)
(52) U.S. Cl.
CPC .................................... *H04N 7/188* (2013.01)

(58) Field of Classification Search
None
See application file for complete search history.

(56) References Cited

U.S. PATENT DOCUMENTS 9,489,745 B1 * 11/2016 Heitz, III ................. G06T 7/50
2021/0398281 A1 * 12/2021 Lys ............................ G06T 5/80

FOREIGN PATENT DOCUMENTS

JP           H0635443 A      2/1994

\* cited by examiner

*Primary Examiner* — Daniel T Tekle
(74) *Attorney, Agent, or Firm* — Boyle Fredrickson, S.C.

(57) ABSTRACT

A method and a smart security camera system are provided for automatically adjusting an activity zone relative to a field of view of a security system imaging device such as video camera. The activity zone is within an initial field of view of the imaging device's camera and includes a monitored area of interest. An image of the activity zone is compared with an image of the updated field of view to determine a position of the activity zone relative to the area of interest in the updated field of view. The activity zone is automatically moved in the updated field of view to the determined position, if necessary. The activity zone thus is shifted a necessary within the updated field of view to encompass the area of interest.

10 Claims, 5 Drawing Sheets

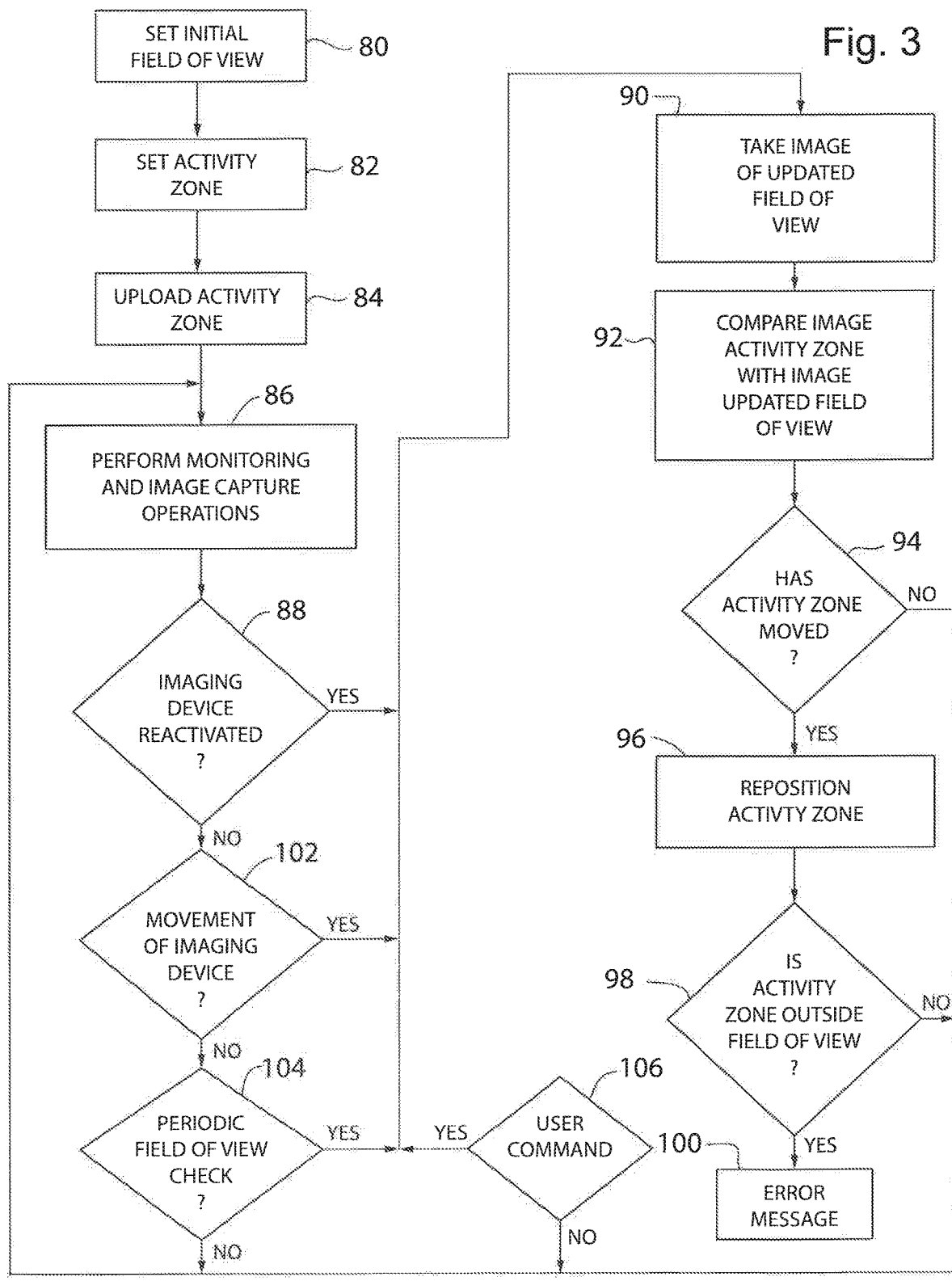

SMART SECURITY CAMERA SYSTEM WITH AUTOMATICALLY ADJUSTABLE ACTIVITY ZONE AND METHOD

CROSS-REFERENCE TO A RELATED APPLICATION

This application claims the benefit of provisional patent application U.S. App. No. 63/178,852, filed on Apr. 23, 2021 and entitled "SMART SECURITY CAMERA SYSTEM WITH AUTOMATICALLY ADJUSTABLE ACTIVITY ZONE AND METHOD", the entire contents of which are hereby expressly incorporated by reference into the present application.

BACKGROUND OF THE INVENTION

1. Field of the Invention

The present invention relates generally to electronic monitoring systems, and in particular, to a method and a smart security camera system for an electronic monitoring system that automatically adjusts the activity zone[s] in which motion is triggered if the field of view of an imaging device of the smart security camera system has shifted.

2. Discussion of the Related Art

Modern electronic monitoring systems for the home often include doorbells, along with video and audio communication technology. The typical electronic monitoring system includes a smart security camera system having one or more imaging devices, typically each including a camera, such as a video recorder, and possibly also including a speaker and a microphone.

The imaging device is configured to allow simultaneous video and audio communication to a user on a computing device. The electronic monitoring system may also include a doorbell which communicates with one such imaging devices or which has its own dedicated camera. The system typically includes a hub or base station that communicates with the imaging devices and one or more user devices such as a desktop computer, a laptop computer, a smartphone, or a tablet. The base station may also communicated with an external server, such as a cloud-based server. Computing and image processing are performed in a controller located, in whole or in part, in some combination of the imaging device(s), the base station, the server, and the user device(s).

The video supplied by the smart security camera system to the controller is provided by at least one of a plurality of available imaging devices provided at different locations. The subject imaging device may be selected by default, based on user input, and/or automatically selected using artificial intelligence such as computer vision. Each imaging device is directed to a corresponding monitored area or "activity zone" within the imaging device's two-dimensional ("XY") visual field of view as defined by the field of view of the imaging device's camera. The activity zone typically contains a feature, such as a door, for example, located in an "area of interest". The activity zone and the corresponding area of interest may comprise the entire field of view of the imaging device but, more typically, comprises a portion of the field of view. Hence, in the simplest case of a rectangular activity zone within a rectangular field of view, the activity zone typically encompasses a smaller area "xy" contained within the larger area XY of the imaging device's field of view which, again, corresponds to the camera's field of view. A triggering event, most typically motion detection, in the monitored activity zone, triggers image capture and related functions. e As a result of limiting the monitored area to an activity zone containing an area of interest, motion in the activity zone is detected and triggers image capture and related functions, whereas motion outside of the activity zone does not. This conditions image capture and related operations, including generation and transmission of alerts to users, to the occurrence of triggering events in an area of interest as defined by the activity zone, avoiding false alarms resulting from motion detection outside of the activity zone.

While functional for their intended purpures, these prior smart security imaging device systems have certain limitations. Specifically, imaging devices in these prior smart security camera systems are often battery operated and, therefore, need periodic charging. As such, when a imaging device is removed from its original location and replaced after charging, the imaging device is often mounted in a slightly different position or orientation (both referred to as "position" henceforth for ease of description)., Further, high winds, earthquakes, and/or other environmental events may also cause a imaging device's position to move or drift. Regardless of the cause of its movement, the imaging device's activity zone shifts or moves relative to the area of interest within the imaging device's field of view Consequently, the activity zone previously specified by the user is now inaccurate to the extent that the area of interest is no longer located at the same location in the imaging device's field of view or, stated another way, the specified activity zone has now moved relative to the feature of interest. For example, an area of interest that was centrally located in the camera's initial field of view may now be located substantially off-center in the updated field of view, while the activity zone remains in the center of the camera's field of view. This apparent shift or displacement of the activity zone away from the area of interest may result in one or both of 1) in "false alarms" in which image capture and related operations are triggered by motion outside of the area of interest and 2) "missed alarms" in which motion in the area of interest is not detected.

Therefore, the need has arisen for a smart security camera system for an electronic monitoring system that automatically adjusts the activity zone in activity is monitored in response to movement of the field of view of an imaging device of the smart security camera system.

The need also has arisen for a smart security camera system for an electronic monitoring system that automatically maintains an activity zone on a an area of interest containing a specific feature or area in a field of view of an imaging device of a smart security camera system as previously specified by a user when an imaging device of the system is removed from its original location and replaced after charging or when the field of view of the imaging device is moved in response to environmental factors.

SUMMARY OF THE INVENTION

In accordance with an aspect of the present invention, a method is provided for automatically adjusting an activity zone relative to a field of view of a security system imaging device. The method includes the steps of defining the activity zone within an initial field of view of the imaging device and determining an updated field of view of the imaging device. An image of the activity zone is compared with an image of the updated field of view to determine a position of the activity zone in the updated field of view. The activity zone automatically moves to the determined position within the updated field of view. In the typical situation in which the activity zone contains a feature of interest, this movement assures that the feature of interest remains in the monitored activity zone even if its position in the updated field of view changes as compared to its position in the initial field of view.

The step of determining an updated field of view of the imaging device may be conducted in response to an event. For example, the event may be reactivating the imaging device after deactivation; the termination of a predetermined time period; a request by a user; and/or detected movement of the imaging device using, for example, an accelerometer.

The security camera system may include a user accessible user device or input device (sometimes called a monitoring device), such as a desktop or laptop computer, a smart phone, or a tablet computer, operatively connected to the imaging device. A user may define the activity zone with the user device. A error signal may be generated if at least a portion of the defined activity zone is positioned outside of updated field of view.

The image of the activity zone and the image of the updated field of view may be defined by pixels. The step of comparing the image of the activity zone with the image of the updated field of view may include a pixel by pixel comparison of pixels in the activity zone to the pixels in the updated field of view.

In accordance with a further aspect of the present invention, a security camera system is provided. The security camera system includes an imaging device, typically including a camera such as a video camera, having a field of view, and a detector operatively connected to the imaging device and configured to generate a trigger signal in response to detection of motion or another, first, detectable triggering event within an activity zone located within the field of view. A controller is operatively connected to the detector and, in response to a second event, is configured to: compare an image of the activity zone with an image of an updated field of view generated in response to the second event to determine a position of the activity zone in the updated field of view; and automatically move the activity zone in the updated field of view to the determined position.

The second event may be at least one of completion of a time period, movement of the imaging device, activation of the imaging device after deactivation of the imaging device, and a user instructed demand to the controller. A user-operated user device or input device may be operatively connected to the imaging device. The user device may be configured to allow a user to input an initial position of the activity zone in the field of view.

The image of the activity zone and the image of the updated field of view may be defined by pixels. The comparison of the activity zone with the image of the updated field of view may include a pixel-by-pixel comparison of the pixels in the image of the activity zone with the pixels in the updated field of view.

The controller may be further configured to generate an error signal if at least a portion of the activity zone is positioned outside of updated field of view. The security camera system may also include an accelerometer operatively connected to the imaging device. The accelerometer may have an output triggering the event in response to the output exceeding a threshold.

In accordance with a still further aspect of the present invention, a method is provided for automatically adjusting an activity zone relative to a field of view of a security system camera in which detection of a first, triggering event in the activity zone triggers an electronic monitoring system.

The method includes defining an activity zone within an initial field of view of the imaging device and storing an image of the activity zone and an initial position of the activity zone in a non-transitory memory. An updated field of view of the imaging device is determined in response to a second event, and the image of the activity zone is compared with an image of the updated field of view to determine an updated position for the activity zone in the updated field of view. The activity zone is automatically moved from the initial position to the updated position in the updated field of view.

The second event may be at least one of completion of a predetermined time period, movement of the security camera system, activation of the security camera system after deactivation of the security camera system, and a user instructed demand to the security camera system. The security camera system may include an accelerometer. The second event may be the accelerometer sensing movement of the security camera system.

An error signal may be generated if at least a portion of the updated position of activity zone is outside of updated field of view. The image of the activity zone and the image of the updated field of view may be defined by pixels. The step of comparing the image of the activity zone with the image of the updated field of view may include a pixel by pixel comparison of the pixels in the activity zone to the pixels in the updated field of view.

These and other objects, advantages and aspects of the invention will become apparent from the following description. The particular objects and advantages described herein can apply to only some embodiments falling within the claims and thus do not define the scope of the invention. In the description, reference is made to the accompanying drawings which form a part hereof, and in which there is shown a preferred embodiment of the invention. Such embodiment does not necessarily represent the full scope of the invention and reference is made, therefore, to the claims herein for interpreting the scope of the invention.

BRIEF DESCRIPTION OF THE DRAWINGS

Preferred exemplary embodiments of the invention are illustrated in the accompanying drawings in which like reference numerals represent like parts throughout, and in which:

FIG. 3 is a flowchart of a methodology for automatically adjusting the activity zone in a field of view of the smart security camera system in accordance with the present invention.

DETAILED DESCRIPTION

Figure 1:
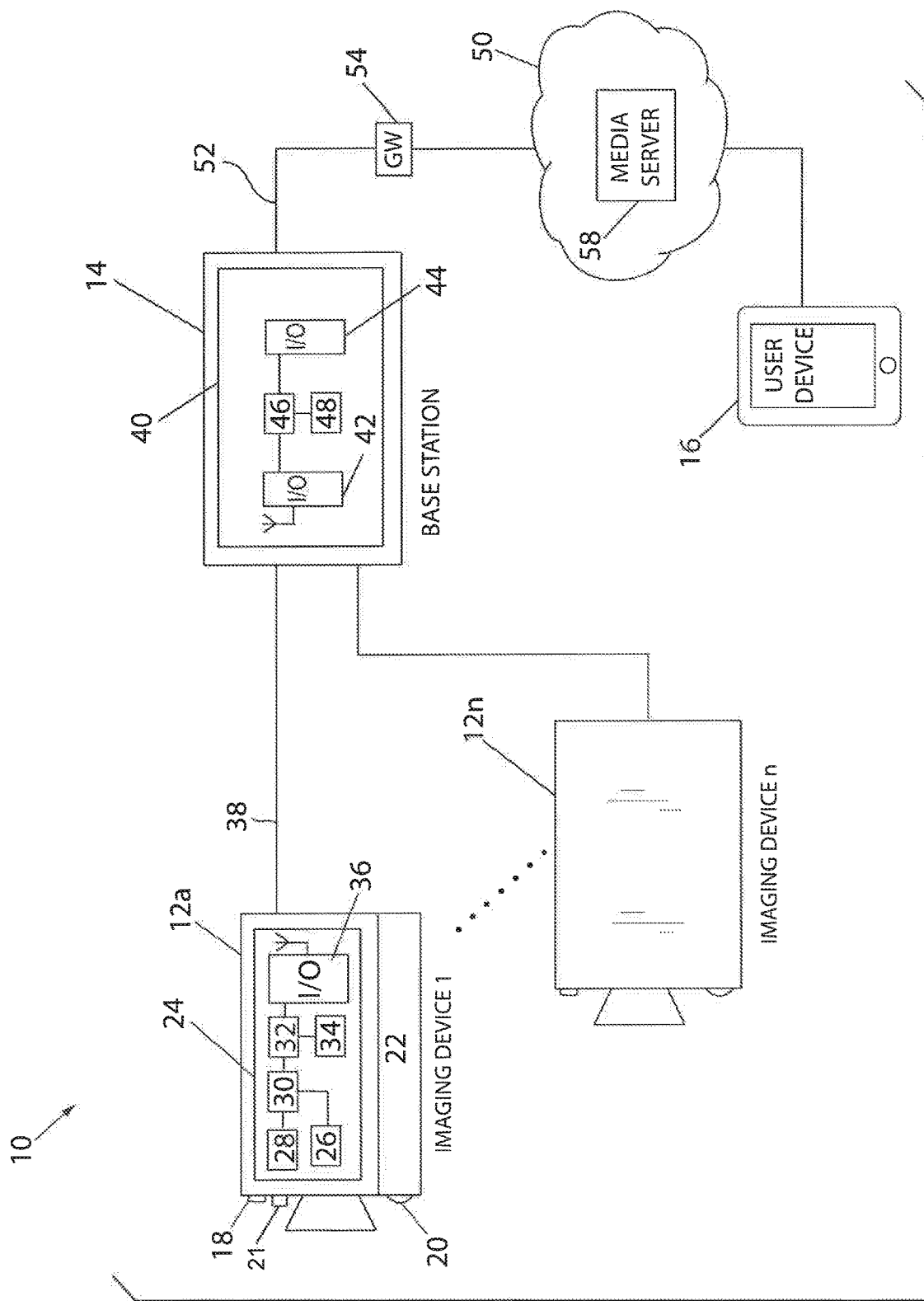
FIG. 1 is schematically illustrates a smart camera system for electronic monitoring which uses two or more imaging devices and a base station in accordance with an aspect of the invention.

Referring now to FIG. 1, in accordance with an aspect of the invention, an electronic system or "smart security camera system"10 for real-time monitoring can include one or more imaging devices 12 and a hub or base station 14. A number "n" 12a-12n of imaging devices are schematically illustrated in FIG. 1. One or more user devices or input devices 16, such as a smart phone, tablet, laptop, or PC communicate with the base station 14. Each user device includes a display that typically includes both an audio display and a video display, internal computing and storage capabilities, and a program or application servicing as a user interface with the remainder of the system 10.

Each imaging device 12 is configured to acquire data and to transmit it to the base station 14 for further processing and/or transmission to a server and/or the user device(s)16. Each imaging devices 12 may be battery powered or wired. The acquired data typically will correspond to a video image, and each imaging device 12 may be or include a camera such as a video camera 24. Several such imaging devices may be mounted around a building or other structure or area being monitored, block 80, FIG. 3. For example, in the case of a residential home, imaging devices 12 could be mounted by each entrance and selected windows, and even on a gate or light pole. An imaging device 12 also could be incorporated into or coupled to a doorbell, floodlight, etc. Still referring to FIG. 1, one or more of the imaging devices 12 may also include a microphone 18, visible and/or infrared (IR) lights 20, a power supply 22, and/or imaging device electronic circuitry 24. Circuit 24 may include an imager 26, an audio circuit 28, a media encoder 30, a processor 32, a non-transient memory storage 34 and/or a wireless I/O communication device 36, among other things. Each imaging device 12 can communicate with the base station 14 through a network such as a private Wireless Local Area Network (WLAN) 38, hosted by the base station 14 operating as an access point. One such network is an IEEE 802.11 network.

Still referring to FIG. 1, the hub or base station 14 can include base station electronic circuitry 40 including a first wireless I/O communication device 42 for communicating with the imaging devices 12 over the WLAN 38, a second wired or wireless I/O communication device 44 for accessing the Wide Area Network (WAN) 50, such as the Internet through a Local Area Network (LAN) 52 connected to a Gateway and/or Router 54, a processor 46 and/or a non-transient memory storage 48, among other things. It should be apparent that "circuity" in the regard can comprise hardware, firmware, software, or any combination thereof In one aspect, the imaging devices 12 could be Arlo® cameras, and the base station 14 could be an Arlo base station, each available on a stand-alone basis or as part of any of a number of systems available from Arlo Technologies, Inc. of Carlsbad, California.

The base station 14 may also be in communication with a server 58, which may be a cloud-server accessible via the WAN 50. The server 58 can include or be coupled to a microprocessor, a microcontroller or other programmable logic element (individually and collectively considered "a controller") configured to execute a program. The controller may be contained in whole in the base station 14 or the server 58. Alternatively, interconnected aspects of the controller and the programs executed by it could be distributed in various permutations within the imaging device 12, the base station 14, the device 16, and the server 58. This program, while operating at the server level, may be utilized in filtering, processing, categorizing, storing, recalling and transmitting data received from the imaging device 12 via the base station 14. Server 58 may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording. The base station also may be eliminated in its entirety, in which case the imaging device 12 would communicate with the external server 58 via the gateway router 54, and the circuitry in the base station would be contained in whole or in part in the imaging device 12, the gateway router 54, and/or the server 58.

Figure 2A:
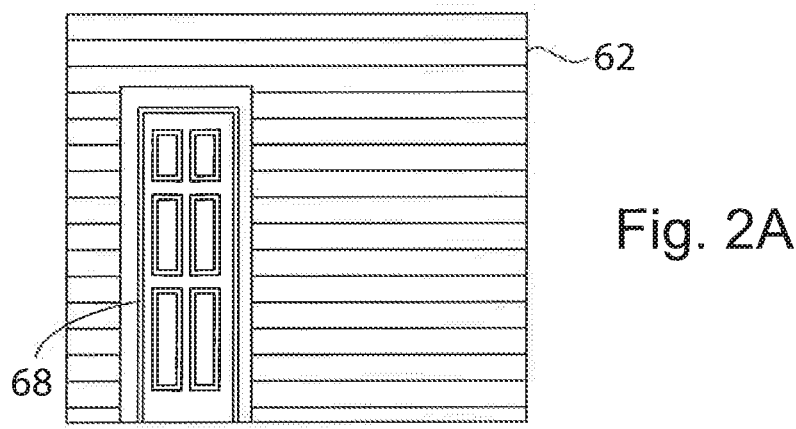
FIG. 2A depicts an initial field of view of an imaging device of the system of FIG. 1.
Figure 2B:
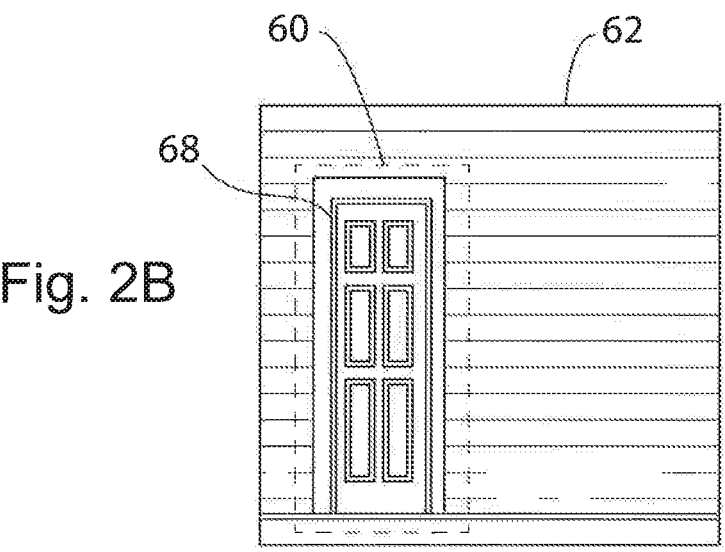
FIG. 2B depicts a user-selected activity zone in the initial field of view of FIG. 2A.
Figure 2C:
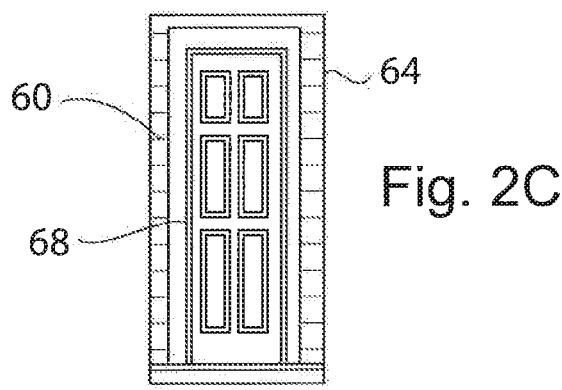
FIG. 2C is an image of the user selected activity zone of FIG. 2B.

Referring to FIGS. 2A and 2B, each imaging device 12 can be configured, though suitable mounting of the imaging device 12 and/or through suitable manipulation of its controls, to monitor an area of interest, such as a part of an outbuilding that includes an area of interest, e.g. a shed door 68. Other examples include a front porch or front walk, a front or rear yard, a parking lot, or an equipment storage area. The monitored area hereinafter is referred to as "activity zone" 60 (FIG. 2B) within a "field of view" 62 of imaging device 12, block 82, FIG. 3. Again, the field of view typically is defined by the field of view of the imaging device's camera. By way of example, it is contemplated for a user to selectively define one or more portions of the field of view 62 of imaging device 12 as activity zones, e.g. activity zone 60, by utilizing the one or more user devices 16. More specifically, a user may "draw" or "create" a rectangular, ovoid, or other geometrical area on a display screen of the user device 16 displaying the field of view 62 of imaging device 12 so as to designate the rectangular or other geometrical area of interest in the field of view 62 as activity zone 60. Alternatively, it is contemplated for the CV on server 58 or elsewhere to define one or more predetermined portions of field of view 62 as activity zones, e.g. activity zone 60, without deviating from the scope of the present invention. A digital image of activity zone 60, as well as the XY coordinates of the activity zone 60 with respect to the field of view 62, are uploaded to server 58 and stored thereon in non-transient memory storage of the controller for future reference, FIG. 2C and block 84, FIG. 3. It can be understood that activity zone 60 may constitute all or part of the field of view 62 of imaging device 12, without deviating from the scope of the present invention.

Figure 2D:
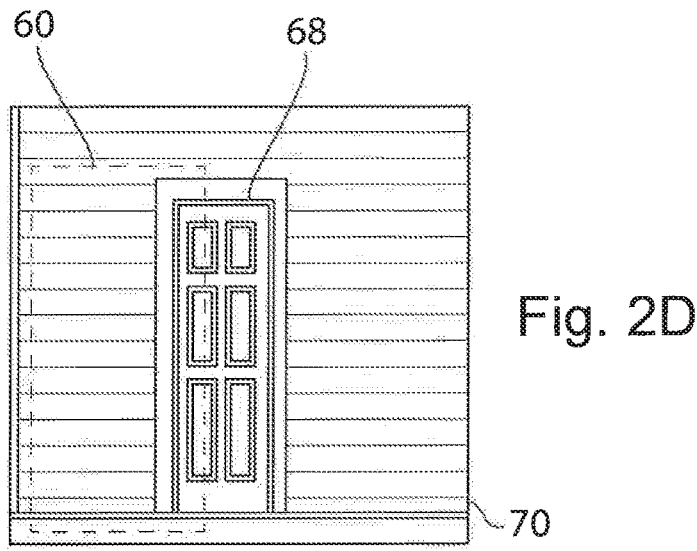
FIG. 2D depicts an updated field of view of the imaging device of the system of FIG. 1 including the user selected activity zone.
Figure 2E:
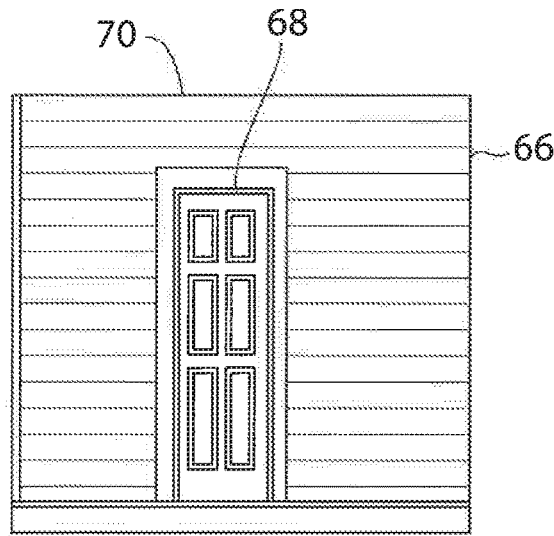
FIG. 2E is an image of the updated field of view of the imaging device of the system of FIG. 2D.

As part of its ordinary monitoring operation, imaging device 12 captures an image 66 of the field of view 62, FIG. 2E, block 86. This capture my occur upon receipt of a command from a user device 16 or automatically by detection of a trigging event in activity zone 60 monitored by a detector 21 (FIG. 1). The triggering event may be motion in activity zone 60, and the detector may be a motion detector. Instead of or in addition to detecting motion, the detector could include an IR sensor detecting heat, such as the body heat of an animal or person. The triggering event also could be sound, in which case the detector may include the microphone 18. In this case, the triggering event may be a sound exceeding a designated decibel level or some other identifiable threshold. Upon receiving notification from an imaging device 12 of a triggering event, the system 10 can generate an alert such as a push notification ("PN") and send it to one or more user devices 16 indicating the triggering event. Importantly, monitored activity outside of the activity zone 60 does not trigger image capture and related operations.

Whether camera operation is triggered by a command from user device 16 or by detection of a triggering event in the activity zone 60, camera 24 of imaging device 12 captures a raw video stream of field of view 62 which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the processor 32 executing the program, the encoded media stream can be transmitted from the wireless I/O communication device 36 to the base station 14.

The media stream may then be transmitted via the WAN 50 to a remote data storage device in communication with a media server 58 for data storage and processing. The storage device may be a cloud-based storage device, and the media sever 58 may be a cloud server accessible via a wireless connection. Server 58 may also communicate with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording. A filtered or otherwise processed image can then be displayed on the user device 16, along with additional visual and/or audio messaging such as a text and/or audio message identifying a generic or particular person or object. Referring to FIG. 2A below, the image that is ultimately displayed on user device 16 may contain the imaging device's entire field of view 62, possibly with the activity zone 60 being contained in a boundary box, highlighted, or otherwise marked. Alternatively, the displayed image may be cropped or limited to an area that is smaller than the field of view 62 but that still contains the activity zone 60.

In view of the foregoing, it can be understood that various events may cause the updated field of view 70 of imaging device 12 to differ from the initial field of view 62. For example, the repositioning of imaging device 12 for repair or charging and/or the movement of imaging device 12 due to environmental factors such as wind, earthquakes or the like may cause an updated field of view 70 of imaging device 12 (FIG. 2D) to differ from the initial field of view 62. Hence, the activity zone 60 may no longer include all of the area of interest, e.g. door 68, which a user intended to monitor, FIG. 2D. More specifically, as heretofore described, imaging device 12 may be battery operated and therefore need periodic charging. As such, when imaging device 12 is deactivated, e.g. due to a lack of power from the battery, the imaging device 12 must be removed from its original position on a corresponding support. After the changing or the charging of the battery, the imaging device 12 is, once again, mounted to the support at its prior position. However, it can be appreciated that the imaging device 12 may be mounted in a slightly different position in the support. Consequently, the initial field of view 62 of imaging device 12 may change to updated field of view 70, FIGS. 2D and 2E.

Figure 2F:
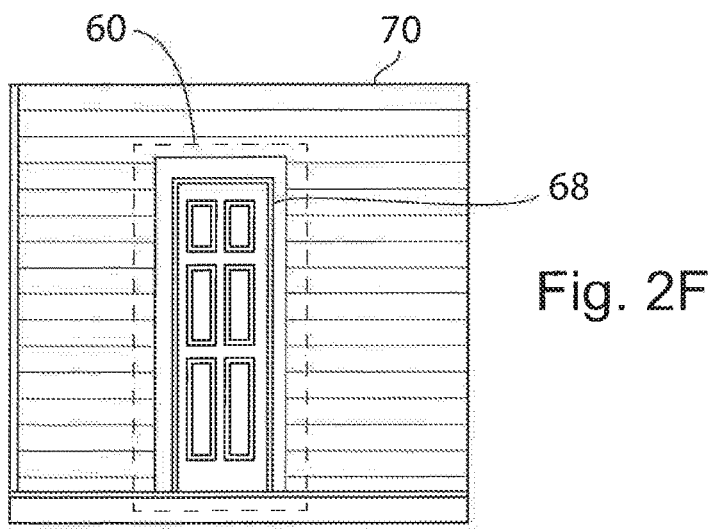
FIG. 2F depicts the user selected activity zone in the updated field of the imaging device of the system of FIG. 1 after adjustment.
Figure 2G:
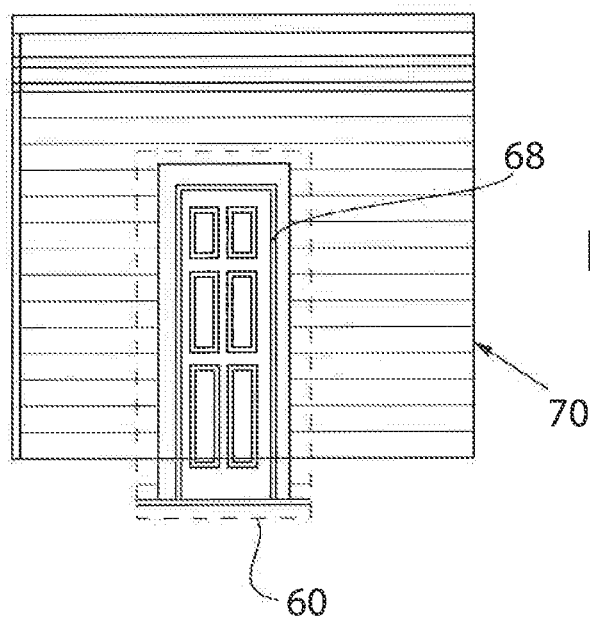
FIG. 2G depicts the user selected activity zone in the updated field of the imaging device of the system of FIG. 1 in an error condition after adjustment.

Referring to FIG. 3, upon reactivation of an imaging device 12 that has been deactivated to charge batteries or for other reasons, block 88, the CV causes imaging device 12 to automatically take a digital image 66 of the updated field of view 70, which image is uploaded to the controller, block 90. Using a pixel by pixel comparison, block 92, the CV compares the digital image 64 of activity zone 60 with the digital image 66 of the updated field of view 70 of imaging device 12 and determines the location of the area of interest in the digital image 66 of the updated field of view 70, typically by determining the XY coordinates of the area, e.g. door 68. The process then determines in block 94 if the XY coordinates of the area of interest in digital image 66 of the updated field of view 70 differ from the XY coordinates of the activity zone 60 in the initial field of view 62. If not, monitoring is resumed in block 86. If so, as is the case in the illustrated embodiment in which the area of interest 68 moves from left portion of the initial field of view 62 to a more central portion of the updated field of view 70 (compare FIG. 2B to FIG. 2D), the activity zone 60 no longer fully encompasses the area of interest 68, as shown in FIG. 2D. In this case, the CV causes imaging device 12 to adjust the position of activity zone 60 from its initial position, FIG. 2A, to the XY coordinates of the area of interest provided in the digital image 66 of the updated field of view 70, FIG. 2F and block 96. The activity zone 60 thus is shifted as necessary within the updated field of view 70 to a new, updated position so that the area or feature of interest 68 remains in the activity zone 60 as shown in FIG. 2F. If the entirety of activity zone 60 cannot be repositioned within the updated field of view 70, e.g. a portion of activity zone 60 lies outside the updated field of view 70, FIG. 2G and block 98, an error message is transmitted to the one or more user devices 16 advising a user that activity zone 60 lies, at least in part, outside of the updated field of view 70 of imaging device 12, block 100.

Alternatively, as previously described, high winds, earthquakes and/or other environmental events may move or change the position of imaging device 12, thereby changing the initial field of view 62, FIG. 2A, to the updated field of view 70, FIG. 2D. As such, it is contemplated to provide imaging device 12 with an accelerometer 72 to monitor movement thereof, FIG. 1. If the output of accelerometer 72 exceeds a threshold, thereby indicating movement of imaging device 12, block 102, the CV receives notice from imaging device 12 and causes imaging device 12 to automatically capture a digital image 66 of the updated field of view 70 and upload the digital image 66 to controller, block 92. Again, using a pixel by pixel comparison, block 94, the CV compares the digital image 64 of activity zone 60 with the digital image 66 of the updated field of view 70 of imaging device 12 and determines the XY coordinates of the area of interest in the digital image 66 of the updated field of view 70. If the XY coordinates of the area of interest in digital image 66 of the updated field of view 70 differ from the XY coordinates of the activity zone 60 in the initial field of view 62, block 96, the CV causes imaging device 12 to adjust the position of activity zone 60 from its initial position, FIG. 2A, to the XY coordinates of the area of interest provided in the digital image 66 of the updated field of view 70, FIG. 2F. If the entirety of activity zone 60 cannot be repositioned within the updated field of view 70, e.g. part or all of activity zone 60 lies outside the updated field of view 70, FIG. 2G and block 98, an error message is transmitted to the one or more input devices 16 advising a user that activity zone 60 lies outside of the updated field of view 70 of imaging device 12, block 100.

Further, it is contemplated for the CV to determine if the field of view 62 of imaging device 12 has changed inadvertently upon receipt of a command from a user through user device 16, block 104, or to periodically check to determine whether the field of view 62 of imaging device 12 has changed inadvertently based upon a schedule set up by a user with user device 16, block 106. More specifically, upon receipt of a command from a user or in accordance with a preprogrammed schedule (e.g. weekly), the CV causes imaging device 12 to automatically take a digital image of the updated field of view 70 which is uploaded to the controller, block 92. Again, using a pixel by pixel comparison, block 94, the CV compares the digital image 64 of activity zone 60 with the digital image 66 of the updated field of view 70 of imaging device 12 and determines the XY coordinates of the area of interest in the digital image 66 of the updated field of view 70. If the XY coordinates of the area of interest in digital image 66 of the updated field of view 70 differ from the XY coordinates of the activity zone 60 in the initial field of view 62, block 96, the CV causes imaging device 12 to adjust the position of activity zone 60 from its initial position, FIG. 2A, to the XY coordinates of the area of interest provided in the digital image 66 of the updated field of view 70, FIG. 2F. If the entirety of activity zone 60 cannot be repositioned within the updated field of view 70, e.g. a portion of activity zone 60 lies outside the updated field of view 70, FIG. 2G and block 98, an error message is transmitted to the one or more user devices 16 advising a user that activity zone 60 lies outside of the updated field of view 70 of imaging device 12, block 100. In either event, monitoring is resumed, block 86.

Various modes of carrying out the invention are contemplated as being within the scope of the following claims particularly pointing out and distinctively claiming a subject matter which applicant regards is the invention.

I claim:

1. A method for automatically adjusting an activity zone relative to a field of view of an imaging device of a security camera system, comprising:
   defining the activity zone within an initial field of view of the imaging device, the activity zone including an area of interest;
   taking a two-dimensional (2D) image of the activity zone, the image of the activity zone being comprised of a plurality of pixels;
   in response to each of reactivation of the imaging device after deactivation of the imaging device, a user instructed demand, and movement of the imaging device, automatically:
   determining an updated field of view of the imaging device;
   taking a 2D image of the updated field of view, the 2D image of the updated field of view being comprised of a plurality of pixels;
   conducting a pixel by pixel comparison of the pixels of the 2D image of the activity zone with the pixels of the 2D image of the updated field of view to determine an updated position of the activity zone in the updated field of view; and
   based on the comparison, moving the activity zone to the updated position in the updated field of view.

2. The method of claim 1, wherein the security camera system includes a user device operatively connected to the imaging device, and wherein a user defines the activity zone with the user device operatively connected to the security camera system.

3. The method of claim 1, further comprising generating an error signal if at least a portion of the activity zone is positioned outside of updated field of view.

4. A security camera system, comprising:
   an imaging device having a field of view;
   a detector operatively connected to the imaging device and configured to generate a trigger signal in response to a first, triggering event occurring within a monitored area of interest contained within an activity zone in the field of view; and
   a controller operatively connected to the detector and being configured to:
   take a two-dimensional (2D) image of the activity zone, the 2D image of the activity zone being comprised of a plurality of pixels, and, in response to each of reactivation of the imaging device after deactivation of the imaging device, a user instructed demand, and movement of the imaging device, automatically:
   take a 2D image of an updated field of view, the 2D image of the updated field of view comprised of a plurality of pixels;
   conduct a pixel by pixel comparison of the pixels of the 2D image of the activity zone with the pixels of the 2D image of the updated field of view generated in response to the second event to determine a position of the area of interest in the updated field of view; and
   based on the comparison, move the activity zone in the updated field of view to encompass the determined position of the area of interest.

5. The security camera system of claim 4, further comprising a user device operatively connected to the imaging device, the user device configured to allow a user to input an initial position of the activity zone in the field of view.

6. The security camera system of claim 4, wherein the controller is further configured to generate an error signal if at least a portion of the activity zone is positioned outside of the updated field of view.

7. The security camera system of claim 4, further comprising an accelerometer operatively connected to the imaging device, the accelerometer having an output triggering the second event in response to the output exceeding a threshold.

8. A method for automatically adjusting an activity zone relative to a field of view of a security system imaging device, wherein detection of a first, triggering event in the activity zone triggers image capture by the imaging device, the method, comprising the steps of:
   defining an activity zone within an initial field of view of the camera, the activity zone including a monitored feature of interest;
   storing a two-dimensional (2D) image of the activity zone and an initial position of the activity zone in a non-transitory memory, the 2D image of the activity zone being comprised of a plurality of pixels;
   in response to each of reactivation of the imaging device after deactivation of the imaging device, a user instructed demand, and movement of the imaging device, automatically:
   determining an updated field of view of the imaging device;
   taking 2D image of an updated field of view, the 2D image of the updated field of view comprised of a plurality of pixels;
   conducting a pixel by pixel comparison of the pixels of the 2D image of the activity zone with the pixels of the 2D image of the updated field of view to determine an updated position for the activity zone in the updated field of view relative to the feature of interest; and in response to the comparison, moving the activity zone from the initial position to the updated position in the updated field of view.

9. The method of claim 8, wherein the event is the accelerometer sensing movement of the imaging device.

10. The method of claim 8, further comprising generating an error signal if at least a portion of the updated position of activity zone is outside of updated field of view.

\* \* \* \* \*